United States Patent
Cho

(10) Patent No.: US 10,809,351 B1
(45) Date of Patent: Oct. 20, 2020

(54) METHOD AND APPARATUS FOR POSITIONING

(71) Applicant: Jaihyung Cho, Daejeon (KR)

(72) Inventor: Jaihyung Cho, Daejeon (KR)

(*) Notice: Subject to any disclaimer, the term of this patent is extended or adjusted under 35 U.S.C. 154(b) by 0 days.

(21) Appl. No.: 16/819,630

(22) Filed: Mar. 16, 2020

(51) Int. Cl.
*H04W 24/00* (2009.01)
*G01S 5/10* (2006.01)
*H04W 4/029* (2018.01)

(52) U.S. Cl.
CPC ............ *G01S 5/10* (2013.01); *H04W 4/029* (2018.02)

(58) Field of Classification Search
USPC ........... 455/456.1, 41.2; 375/340; 705/14.58, 705/7.13
See application file for complete search history.

(56) References Cited

U.S. PATENT DOCUMENTS

| | | | | |
|---|---|---|---|---|
| 8,600,674 | B1* | 12/2013 | Barbeau | H04W 4/029 701/524 |
| 9,942,702 | B1* | 4/2018 | McMullen | H04W 64/003 |
| 2009/0220032 | A1* | 9/2009 | Rosenqvist | H04B 7/0848 375/340 |
| 2014/0222570 | A1* | 8/2014 | Devolites | G06Q 30/0267 705/14.58 |
| 2015/0304941 | A1* | 10/2015 | Syrjarinne | H04L 67/18 455/41.2 |
| 2015/0324944 | A1* | 11/2015 | Lord | G01C 21/3438 705/7.13 |
| 2019/0235044 | A1* | 8/2019 | Liu | G01S 5/30 |
| 2020/0021327 | A1* | 1/2020 | Ciccarelli | H04B 1/525 |

* cited by examiner

*Primary Examiner* — David Q Nguyen
(74) *Attorney, Agent, or Firm* — IPLA P.A.; James E. Bame

(57) ABSTRACT

Provided is a positioning method of a user equipment performed by the user equipment, the method including receiving first and second reference signals from at least two transmitters installed at positions with different heights; acquiring first snapshot vectors based on received data samples of the first reference signal and acquiring second snapshot vectors based on received data samples of the second reference signal; calculating a first covariance matrix based on the first snapshot vectors and calculating a second covariance matrix based on the second snapshot vectors; estimating a difference between a reception delay time of the first reference signal and a reception delay time of the second reference signal based on the first and second covariance matrices; and estimating a vertical position of the user equipment based on the difference between the reception delay time of the first reference signal and the reception delay time of the second reference signal.

18 Claims, 10 Drawing Sheets

METHOD AND APPARATUS FOR POSITIONING

BACKGROUND

The present disclosure of the following description relates to a positioning method and apparatus for measuring a position of a user equipment (UE) in a vertical direction.

A communication system may include a core network, for example, a mobility management entity (MME), a serving gateway (SGW), a packet data network (PDN) gateway (PGW), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

In a communication system, a UE may generally transmit and receive data through a base station. For example, if data to be transmitted to a second UE is present, a first UE may generate a message including the data to be transmitted to the second UE and may transmit the generated message to a first base station to which the first UE belongs. The first base station may receive the message from the first UE and may verify that a destination of the received message is the second UE. The first base station may transmit the message to a second base station to which the verified destination, that is, the second UE belongs in a second base station addition time section. The second base station may receive the message from the first base station and may verify that the destination of the received message is the second UE. The second base station may transmit the message to the verified destination, that is, the second UE. The second UE may receive the message from the second base station and may acquire the data included in the received message.

A reference signal may be transmitted and received between a UE and a base station. As another example, a reference signal may be transmitted and received between two different base stations. The reference signal may be used for various purposes. For example, the UE or the base station may perform synchronization or may estimate a position of the UE using the reference signal. As one of positioning methods using RAT, the UE may estimate a position of the UE by measuring a difference in time of arrival (ToA) between positioning reference signals (PRSs) received from a plurality of base stations.

The UE or the base station may calculate a reception delay time of the reference signal. Here, the reception delay time of the reference signal may represent a time difference between a point in time at which the reference signal is transmitted from a transmitter and a point in time at which the reference signal is received at a receiver. If an obstacle is present between the transmitter and the receiver, it may not be easy to calculate the reception delay time of the reference signal.

Among positions of the UE, it is difficult to improve an estimation accuracy of a position of the UE in a vertical direction, that is, a vertical position of the UE. To classify a position of the UE based on a floor unit indoors, a positioning error in the vertical direction needs to be 3 meter or less. However, current positioning technologies do not meet the aforementioned positioning error in the vertical direction.

SUMMARY OF THE INVENTION

At least one example embodiment provides a positioning method and apparatus that may reduce a positioning error of a UE (UE) in a vertical direction.

According to an aspect, there is provided a positioning method of a UE performed by the UE, the positioning method including receiving a first reference signal and a second reference signal from at least two transmitters installed at positions with different heights; acquiring a plurality of first snapshot vectors based on received data samples of the first reference signal and acquiring a plurality of second snapshot vectors based on received data samples of the second reference signal; calculating a first covariance matrix based on the plurality of first snapshot vectors and calculating a second covariance matrix based on the plurality of second snapshot vectors; estimating a difference between a reception delay time of the first reference signal and a reception delay time of the second reference signal based on the first covariance matrix and the second covariance matrix; and estimating a vertical position of the UE based on the difference between the reception delay time of the first reference signal and the reception delay time of the second reference signal.

The first reference signal may include a plurality of subcarriers included in a first subcarrier group, and the second reference signal may include a plurality of subcarriers included in a second subcarrier group.

The plurality of subcarriers included in the first subcarrier group and the plurality of subcarriers included in the second subcarrier group may be provided at equal intervals in a frequency domain.

A subcarrier included in the first subcarrier group and a subcarrier included in the second subcarrier group may be orthogonal to each other.

Each of the first reference signal and the second reference signal may be transmitted through a plurality of consecutive symbols, and a waveform of each of the first reference signal and the second reference signal may continue in a boundary between consecutive symbols.

Each of the first snapshot vector and the second snapshot vector may be represented as a multiplication of a plurality of matrices, and at least one of the plurality of matrices may meet a condition for Vandermonde matrix.

The positioning method may further include calculating an eigenvector of the first covariance matrix and an eigenvector of the second covariance matrix, estimating the reception delay time of the first reference signal based on the eigenvector of the first covariance matrix, and estimating the reception delay time of the second reference signal based on the eigenvector of the second covariance matrix.

The positioning method may further include acquiring reference information about the difference between the reception delay time of the first reference signal and the reception delay time of the second reference signal at one or more reference points. The estimating of the vertical position of the UE may include estimating the vertical position of the UE based on the reference information and the difference between the reception delay time of the first reference signal and the reception delay time of the second reference signal.

The positioning method may further include acquiring information about a horizontal position coordinate of the UE. The estimating of the vertical position of the UE may include estimating the vertical position of the UE based on the horizontal position coordinate of the UE and the difference between the reception delay time of the first reference signal and the reception delay time of the second reference signal.

According to at least one example embodiment, it is possible to estimate a vertical position of a UE, that is, a position of the UE in a vertical direction based on a difference between reception delay times of reference signals transmitted at different heights.

Also, according to at least one example embodiments, it is possible to improve an accuracy in estimating a position of a UE in a vertical direction in such a manner that the UE acquires a plurality of snapshot vectors and estimates a reception delay time of a reference signal based on the acquired snapshot vectors.

Also, according to at least one example embodiment, a base station may transmit a reference signal having a waveform continuous in a boundary between symbols and a UE may readily acquire a plurality of snapshot vectors accordingly.

Also, according to at least one example embodiments, a base station may transmit a reference signal using subcarriers provided at equal intervals in a frequency domain and a UE may readily calculate a snapshot vector and a covariance matrix.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

DETAILED DESCRIPTION OF THE INVENTION

Figure 1:
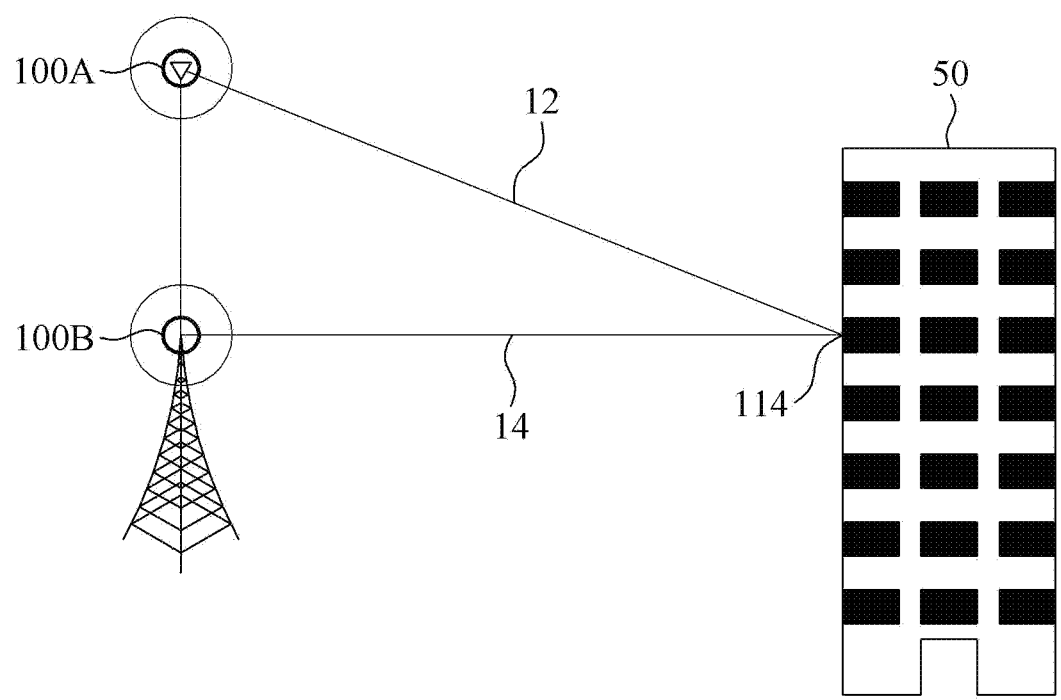
FIG. 1 illustrates an example of a communication system according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (includes/including)," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, a reference signal may include, for example, a signal for positioning of a user equipment (UE), a signal for synchronization of the UE or a base station, and the like. However, it is provided as an example only. A method of estimating a reception delay time of a reference signal disclosed herein may apply to estimating a reception delay time of another signal aside from the reference signal. Here, although an example embodiment is described based on an example of estimating the reception delay time of the reference signal for clarity of description, it is provided as an example only. It should be understood that a method of estimating the reception delay time of the other signal aside from the reference signal is included in the example embodiment.

FIG. 1 illustrates an example of a communication system according to at least one example embodiment.

Referring to FIG. 1, the communication system may include a first transmitter 100A and a second transmitter 100B installed at different heights. The first transmitter 100A and the second transmitter 100B may be installed at different heights, respectively, in the same base station. As another example, the first transmitter 100A and the second transmitter 100B may be installed at different heights in different base stations, respectively. As another example, the first transmitter 100A and the second transmitter 100B may be installed at different heights in one or more buildings. A difference between a height at which the first transmitter 100A is installed and a height at which the second transmitter 100B is installed may be determined based on a horizontal distance between a building 50 to be measured and each of the first transmitter 110A and the second transmitter 100B and a desired positioning accuracy. For example, if the horizontal distance between each of the first transmitter 100A and the second transmitter 100B and the building 50 to be measured is relatively great, a height difference between the first transmitter 100A and the second transmitter 100B may be set to be relatively great. As another example, if the horizontal distance between each of the first transmitter 100A and the second transmitter 100B and the building 50 to be measured is relatively small, the height difference between the first transmitter 100A and the second transmitter 100B may be set to be relatively small.

Here, each of the first transmitter 100A and the second transmitter 100B may be referred to as, for example, NodeB, evolved NodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. Each of a plurality of UEs may be referred to as a terminal, an access terminal, a mobile terminal, a station, a subscriber station, a mobile station, a portable subscriber station, a node, a device, and the like.

A UE present in the building 50 to be measured may receive a first reference signal 12 from the first transmitter 100A and may receive a second reference signal 14 from the second transmitter 100B. The first and second reference signals 12 and 14 may be transmitted at different positions. The UE may estimate a reception delay time of the first reference signal 12 and may also estimate a reception delay time of the second reference signal 14. The UE may estimate a position 114 of the UE based on the reception delay time of the first reference signal 12 and the reception delay time of the second reference signal 14. Although FIG. 1 illustrates an example in which the UE is present in the building 50 to be measured, it is provided as an example only. The UE may be present in an outdoor environment or other environments. Also, although two transmitters, for example, the first transmitter 100A and the second transmitter 100B, are illustrated in FIG. 1 for clarity of description, it is provided as an example only. At least three transmitters may transmit a reference signal to the UE. At least two transmitters among the at least three transmitters may be provided at different heights.

Figure 2:
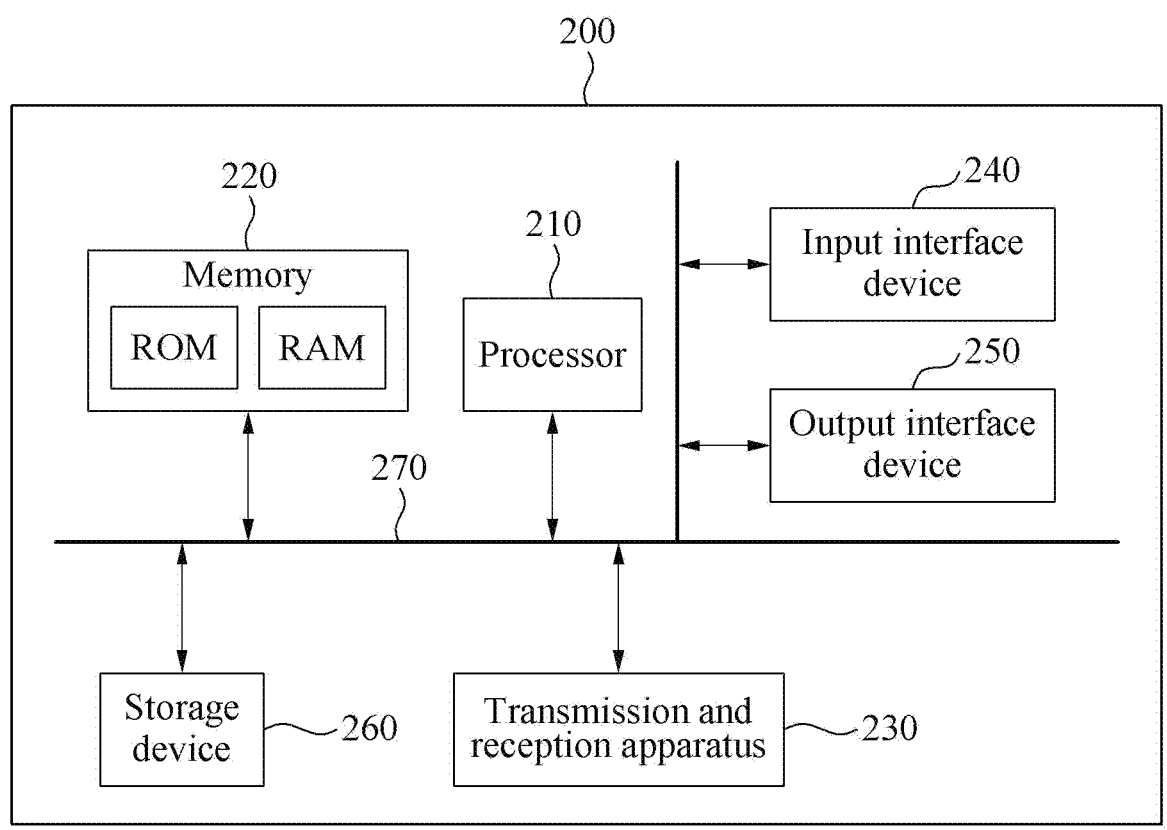
FIG. 2 is a diagram illustrating an example of a configuration of a communication node included in a communication system according to at least one example embodiment.

FIG. 2 is a diagram illustrating an example of a configuration of a communication node included in a communication system according to at least one example embodiment.

Referring to FIG. 2, a communication node 200 may include at least one processor 210, a memory 220, and a transmission and reception apparatus 230 configured to perform communication through connection to a network. Also, the communication node 200 may further include an input interface device 240, an output interface device 250, and a storage device 260. Here, the input interface device 240 and the output interface device 250 may constitute a communication interface. The components included in the communication node 200 may communicate with each other through connection to a bus 270.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

Figure 3:
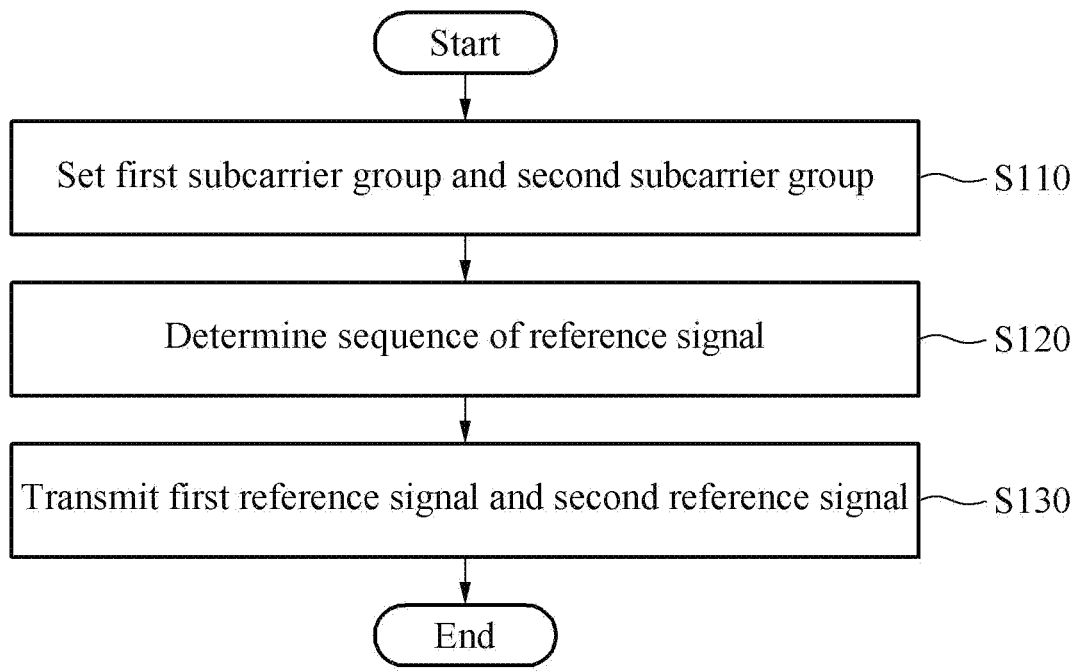
FIG. 3 is a flowchart illustrating an example of a method of transmitting, by a base station, a reference signal according to at least one example embodiment.

FIG. 3 is a flowchart illustrating an example of a method of transmitting, by a base station, a reference signal according to at least one example embodiment.

The example embodiment of FIG. 3 is described with the assumption that the first transmitter 110A and the second transmitter 110B are provided at different heights. However, as described above, the first transmitter 110A and the second transmitter 110B may be installed in different base stations or different buildings.

Referring to FIG. 3, in operation S110, the base station may set a first subcarrier group for transmitting a first reference signal and a second subcarrier group for transmitting a second reference signal. The first transmitter 110A may transmit the first reference signal using the first subcarrier group, and the second transmitter 110B may transmit the second reference signal using the second subcarrier group. Subcarriers of the first subcarrier group may be orthogonal to subcarriers of the second subcarrier group.

Figure 4:
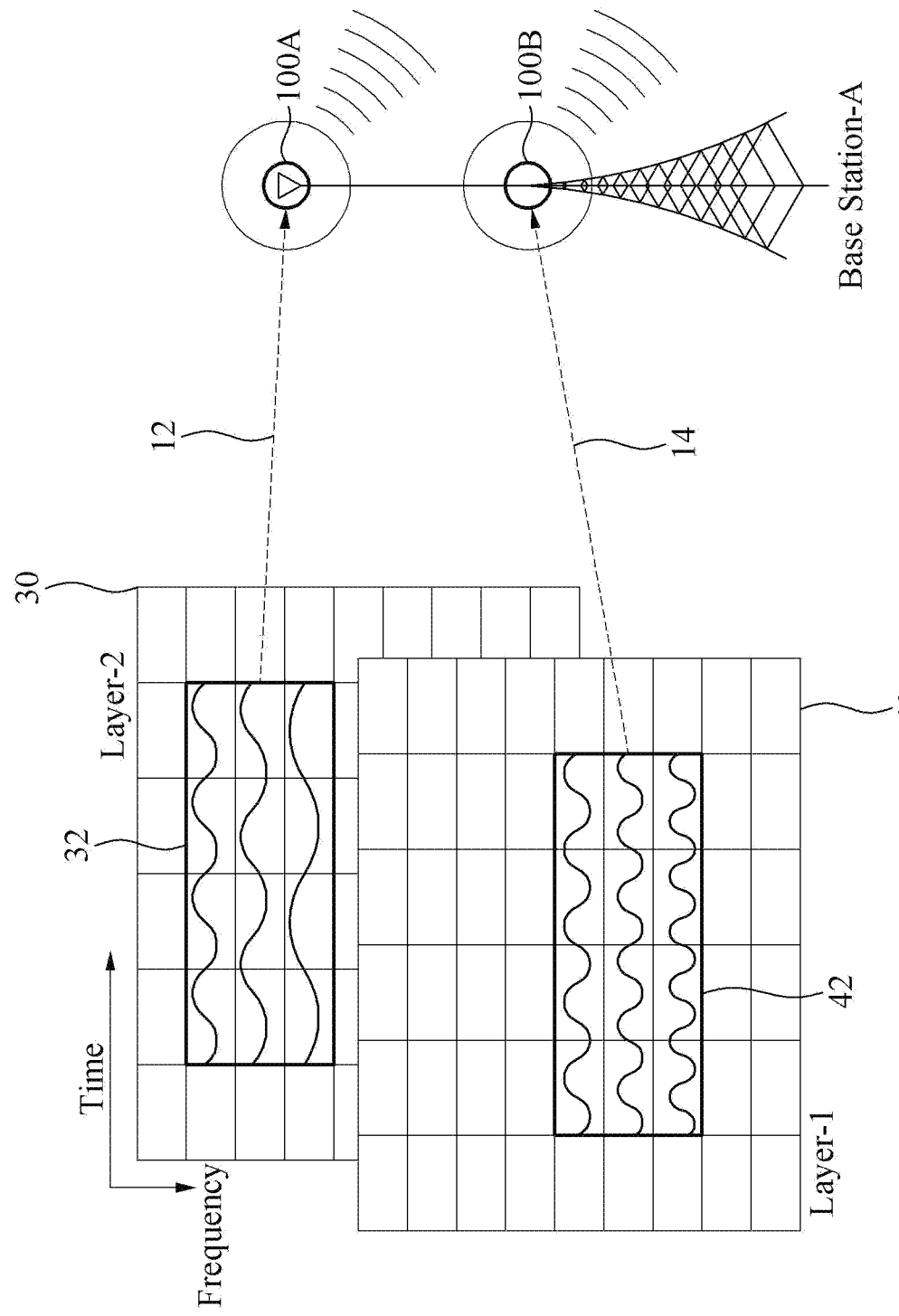
FIG. 4 illustrates an example of a first subcarrier group for transmitting a first reference signal and a second subcarrier group for transmitting a second reference signal according to at least one example embodiment.

FIG. 4 illustrates an example of a first subcarrier group 32 for transmitting a first reference signal and a second subcarrier group 42 for transmitting a second reference signal according to at least one example embodiment.

Referring to FIG. 4, the first transmitter 100A may transmit the first reference signal in a waveform continuous in a boundary between symbols using the first subcarrier group 32. The second transmitter 100B may transmit the second reference signal in a waveform continuous in a boundary between symbols using second subcarrier group 34. Each of the first reference signal and the second reference signal may be transmitted through a plurality of consecutive symbols. Since each of the first reference signal and the second reference signal has the waveform continuous in the boundary between symbols, a UE receiving the first reference signal and the second reference signal may readily acquire a plurality of snapshot vectors. It is described below.

Subcarriers included in the first subcarrier group may be provided at equal intervals in a frequency domain. Likewise, subcarriers included in the second subcarrier group may be provided at equal intervals in the frequency domain. FIG. 4 illustrates an example in which an interval between the subcarriers of the first subcarrier group is 1 and an example in which an interval between the subcarriers of the second subcarrier group is 1. However, it is provided as an example only. For example, the subcarriers included in the first subcarrier group or the second subcarrier group may be provided at intervals greater than 1. Also, the interval between the subcarriers of the first subcarrier group may differ from the interval between the subcarriers of the second subcarrier group.

If subcarriers are provided at equal intervals in each of the first subcarrier group and the second subcarrier group, the following matrix used for the UE to interpret a snapshot vector may meet Vandermonde matrix. Therefore, the UE may readily estimate a delay time of the first reference signal and a delay time of the second reference signal based on the plurality of snapshot vectors.

A layer of a first resource block 30 in which the first reference signal is transmitted may be set to differ from a layer of a second resource block 40 in which the second reference signal is transmitted. Therefore, a subcarrier of the first subcarrier group 32 and a subcarrier of the second subcarrier group 34 may be orthogonal to each other. The UE may independently estimate each of the delay time of the first reference signal and the delay time of the second reference signal based on an aspect that the first reference signal and the second reference signal are orthogonal to each other.

Referring again to FIG. 3, in operation S120, the base station may determine a sequence of the first reference signal and a sequence of the second reference signal. The base station may determine the sequence of the first reference signal and the sequence of the second reference signal such that the first reference signal and the second reference signal may be continuous in the boundary between the symbols. In operation S130, the base station may transmit the first reference signal generated using the sequence of the first reference signal through the first transmitter 100A. The base station may transmit the second reference signal generated using the sequence of the second reference signal through the second transmitter 100B.

Hereinafter, a sequence of a reference signal such that the reference signal may be continuous in a boundary between symbols is described.

Figure 5:
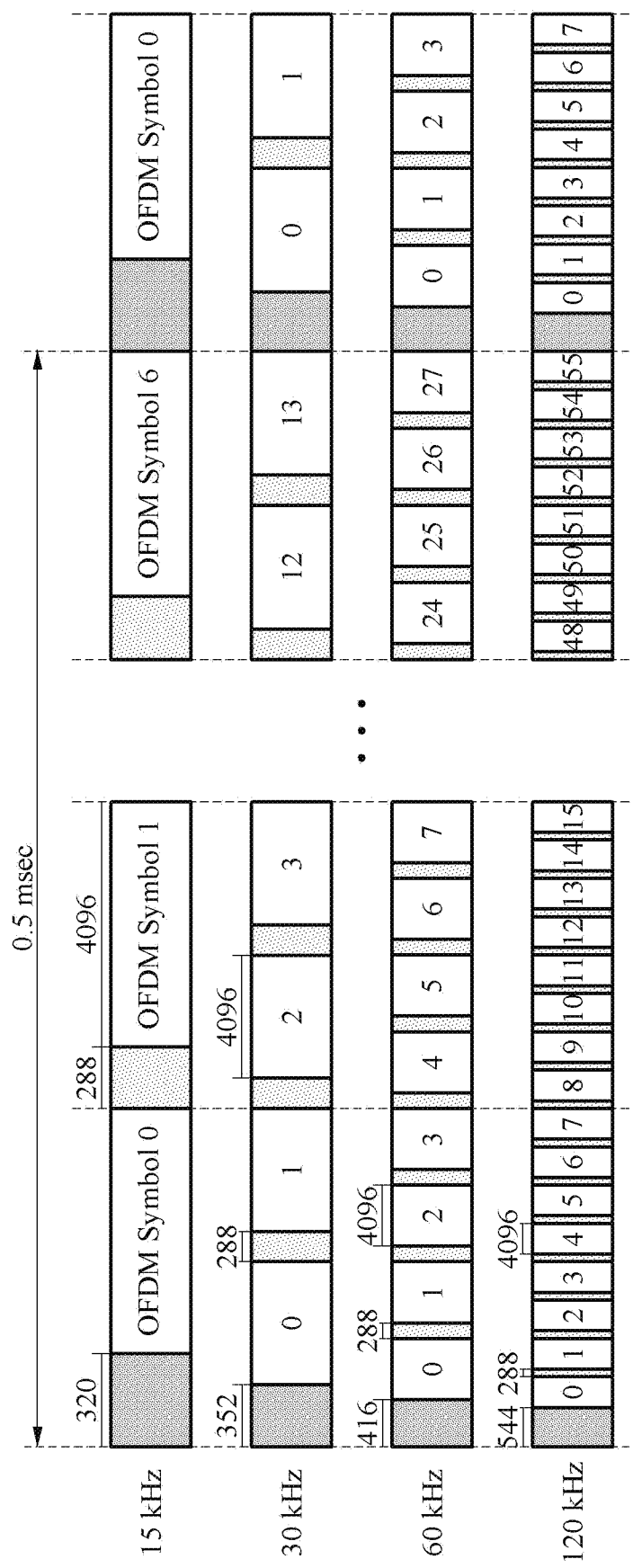
FIG. 5 illustrates an example of a structure of an orthogonal frequency division multiplexing (OFDM) symbol in a 5-th generation new radio (NR) standard according to at least one example embodiment.

FIG. 5 illustrates an example of a structure of an orthogonal frequency division multiplexing (OFDM) symbol in a 5G new radio (NR) standard according to at least one example embodiment.

Referring to FIG. 5, in the 5G NR standard, $(7 \times 2^\mu)$ OFDM symbols may be included in 0.5 ms. That is, if a subcarrier spacing is 15 kHz, 7 OFDM symbols may be included in 0.5 ms, if the subcarrier spacing is 30 kHz, 14 OFDM symbols may be included in 0.5 ms, if the subcarrier spacing is 60 kHz, 28 OFDM symbols may be included in 0.5 ms, if the subcarrier spacing is 120 kHz, 56 OFDM symbols may be included in 0.5 ms, if the subcarrier spacing is 240 kHz, 112 OFDM symbols may be included in 0.5 ms, and if the subcarrier spacing is 480 kHz, 224 OFDM symbols may be included in 0.5 ms. Here, if the subcarrier spacing is 60 kHz and an extended cyclic prefix (CP) is used, 24 OFDM symbols may be included in 0.5 ms.

To meet a condition that a sum of lengths of $7 \times 2^\mu$ OFDM symbols is 0.5 ms, a length of CP included in a first OFDM symbol in 0.5 ms duration may be greater than a length of CP included in a remaining symbol. The length of CP included in the remaining symbol excluding the first symbol in the 0.5 ms duration may be $144 T_S \times 2^{-\mu}$. Also, the length of CP of the first symbol in the 0.5 ms duration may be $144 T_S \times 2^{-\mu} + 16 T_S$.

In the 5G NR standard, a length of a valid period of a symbol may be represented as a basic time unit $T_s$ according to Equation 1.

$$N_u^\mu = 2048 T_s \cdot 2^{-\mu} \quad \text{[Equation 1]}$$

In Equation 1, μ denotes a parameter (i.e., NR numerology number) that determines the subcarrier spacing and $N_u^\mu$ denotes the length of the valid period of the symbol that is represented as the basic time unit.

In the 5G NR standard, the CP length may be represented as the basic time unit $T_s$ according to Equation 2.

$$N_{CP,\ell}^\mu = \begin{cases} 512 T_s \cdot 2^{-\mu} & \text{extended cyclic prefix} \\ 144 T_s \cdot 2^{-\mu} + 16 & \ell = 0 \text{ or } \ell = 7 \cdot 2^\mu \\ 144 T_s \cdot 2^{-\mu} & \ell \neq 0 \text{ and } \ell \neq 7 \cdot 2^\mu \end{cases} \quad \text{[Equation 2]}$$

In Equation 2, for simplicity, it is assumed that an index of a symbol is numbered for each subframe. In this case, in a single subframe, a symbol with an index of l=0 and a symbol with an index of $l=7 \cdot 2^\mu$ may correspond to the first symbols in 0.5 ms duration. In contrast, an index of a remaining symbol excluding the first symbol in the 0.5 ms duration may satisfy l≠0 and $l \neq 7 \cdot 2^\mu$. In each case, the CP length may be determined according to Equation 2.

The UE may estimate a reception delay time of a reference signal by applying a super resolution analysis algorithm. If the super resolution analysis algorithm is applied, a large number of snapshot vectors may be required. The UE may set a plurality of summation time intervals within a time interval in which the reference signal is received to acquire a snapshot vector. The UE may extract snapshot vectors in different summation time intervals by moving, i.e., shifting a start point of a summation time interval. Here, if the reference signal is discontinuous in a boundary between symbols, a summation time interval may be limited to be present in a single symbol. Accordingly, it may be difficult for the UE to acquire a sufficient number of snapshot vectors in a time interval in which the reference signal is received.

In general, an OFDM transmission method is used to describe that a reference signal is discontinuous in a boundary between symbols.

In OFDM, the respective subcarrier components may be orthogonal to each other and a signal may be represented as a sum of N complex sine waves. Therefore, a random signal may be represented as Equation 3.

$$x_\ell[n] = \sum_{k=0}^{N-1} X_\ell[k] e^{j 2 \pi k n / N}, n = 0, 1, 2, 3, \ldots N - 1 \quad \text{[Equation 3]}$$

In Equation 3, N denotes a total number of subcarriers and Xl[k] denotes a frequency domain complex exponentiation representing an initial phase and amplitude of a k-th subcarrier of an l-th symbol.

Figure 6:
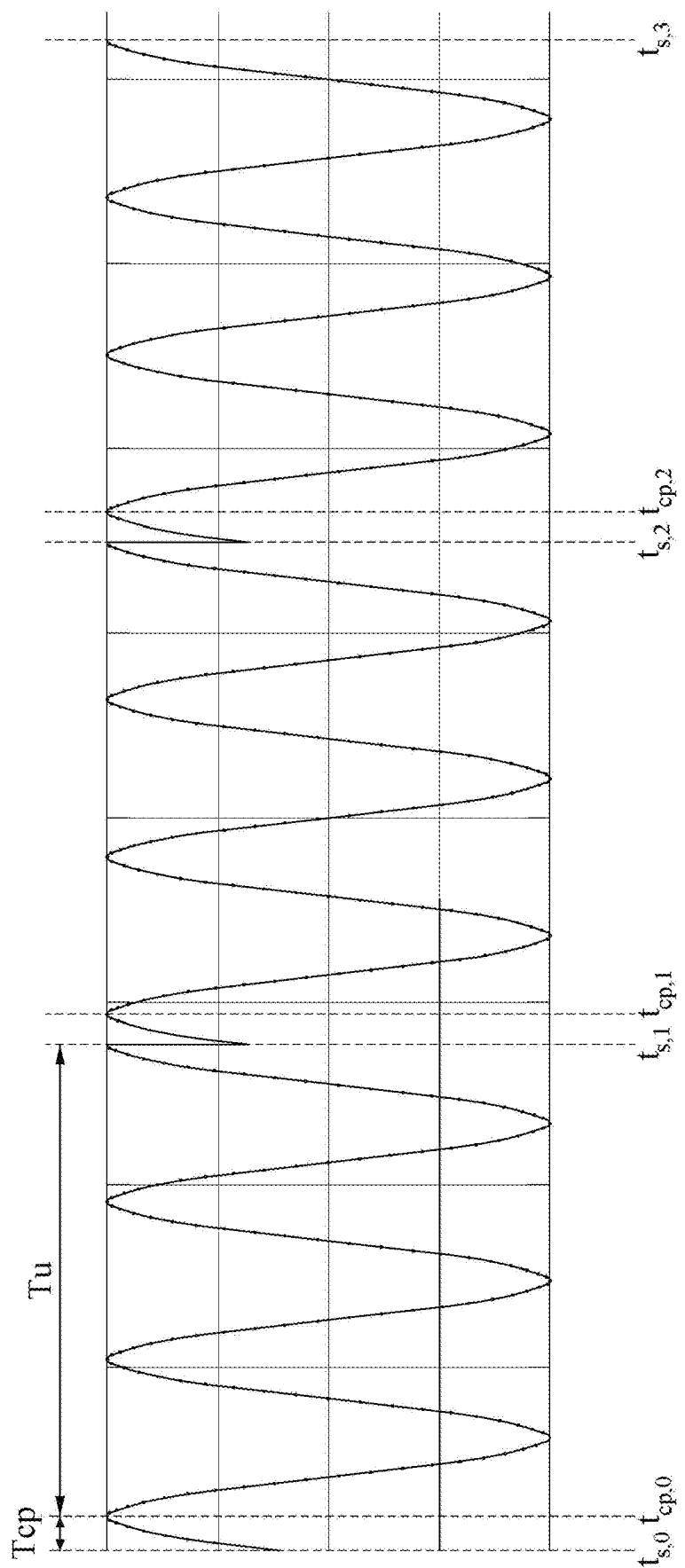
FIG. 6 illustrates an example of a subcarrier, for example, corresponding to k=3, discontinuous in a boundary between OFDM symbols according to at least one example embodiment.

FIG. 6 illustrates an example of a subcarrier discontinuous in a boundary between OFDM symbols according to at least one example embodiment. In FIG. 6, a subcarrier corresponds to, for example, k=3.

Referring to FIG. 6, $t_{s,0}$, $t_{s,1}$, $t_{s,2}$, and $t_{s,3}$ denote a start point of a zero-th symbol, a start point of a first symbol, a start point of a second symbol, and a start point of a third symbol, respectively. Also, $t_{cp,0}$ denotes an end point of a CP duration of the zero-th symbol and also a start point of a valid period of the zero-th symbol. Likewise, $t_{cp,1}$ and $t_{cp,2}$ denote an end point of a CP duration of the first symbol and an end point of a CP duration of the second symbol, respectively. $T_u$ denotes a length of a valid period of a symbol and $T_{CP}$ denotes a length of a CP duration of the symbol.

During the valid period of the symbol ($T_u$), a phase of a sine wave may rotate by an integer multiple of $2\pi$ (e.g., if k=3, $2\pi \times 3 = 6\pi$). Accordingly, a signal phase $\varphi_0$ at $t_{cp,0}$ that is the start point of the valid period of the zero-th symbol may be equal to a signal phase at $t_{s,1}^-$ that is the end point of the zero-th symbol. Here, $t_{s,1}^-$ may indicate a left limit of $t_{s,1}$ and $t_{s,1}^+$ may indicate a right limit of $t_{s,1}$. Referring to FIG. 6, a signal phase at $t_{s,1}^-$ may differ from a signal phase at $t_{s,1}^+$. While the signal phase may be $\varphi_{0\ at\ t_{s,1}^-}$, the signal phase may be $$\varphi_0 - 2\pi k \cdot \frac{T_{CP}}{T_u} \text{ at } t_{s,1}^+.$$

That is, the signal may be discontinuous at $t_{s,1}$.

If a normal CP is applied in a 4G or 5G system, $T_{cp}/T_u = 9/128$. Also, if an extended CP is applied in the 4G or 5G system, $T_{cp}/T_u = 1/4$.

The base station may change a signal phase at $t_{cp,1}$ to differ from a signal phase at $t_{cp,0}$ such that a signal phase at $t_{s,1}^-$ may be equal to a signal phase at $t_{s,1}^+$. For example, if the signal phase at $t_{cp,1}$ is set to $$\varphi_0 + 2\pi k \cdot \frac{T_{CP}}{T_u},$$

the signal phase at $t_{s,1}^-$ may become equal to the signal phase at $t_{s,1}^+$. That is, the signal may be continuous at $t_{s,1}$. Generally describing, the base station may set a sequence of a reference signal such that a phase of a sequence of an n-th symbol may be shifted by a phase corresponding to a CP duration of an (n−1)-th symbol compared to a phase of a sequence of the (n−1)-th symbol. Here, n denotes a natural number. In an LTE standard, n=1, 2, . . . 6. In a 5G NR standard, n denotes a random natural number.

For example, the base station may determine the sequence of the reference signal to satisfy Equation 4.

$$X_\ell[k] = X_{\ell-1}[k] \cdot \exp\left(2\pi jk \cdot \frac{T_{CP,\ell-1}}{T_u}\right) \quad \text{[Equation 4]}$$

In Equation 4, $X_\ell[k]$ denotes a frequency domain complex exponentiation representing an initial phase and amplitude of a k-th subcarrier of an l-th symbol, $T_u$ denotes a length of a valid period of a symbol, and $T_{CP,l-1}$ denotes a length of a CP duration of an (l−1)-th symbol. Here, l denotes a natural number. In the LTE standard, an index of a symbol may be counted for each slot. If a normal CP is used in the LTE standard, l=1, 2, . . . 6. If an extended CP is used in the LTE standard, l=1, 2, . . . 5. In the 5G NR standard, an index of a symbol may continuously increase in a time domain. Accordingly, in the 5G NR standard, l may be a random natural number.

Referring to Equation 4, in a sequence of a reference signal, a sequence value corresponding to the l-th symbol may correspond to a value that is phase-shifted by $$2\pi k \cdot \frac{T_{CP,\ell-1}}{T_u}$$

from a sequence value corresponding to the (l−1)-th symbol. Differently representing, Equation 4, it may be expressed as Equation 5.

$$X_\ell[k] = X_0[k] \cdot \exp\left(2\pi jk \cdot \sum_{i=1}^{\ell} \frac{T_{CP,i-1}}{T_u}\right) \quad \text{[Equation 5]}$$

In Equation 5, $X_0[k]$ denotes a frequency domain complex exponentiation representing an initial phase and amplitude of a k-th subcarrier of an initial symbol (symbol index=0).

In the LTE standard, a sequence component of a symbol not present at a start point of a slot may be phase-shifted from a sequence component of a previous symbol by $$2\pi k \times \frac{9}{128}.$$

If the normal CP is applied in the LTE standard, a sequence of a reference signal may be represented as Equation 6.

$$X_{s,\ell}[k] = (-1)^{s \cdot k} \varphi_{init}^k \cdot \exp\left(2\pi jk \cdot \ell \cdot \frac{T_{cp}}{T_u}\right) \quad \text{[Equation 6]}$$

In Equation 6, $\varphi_{init}^k$ denotes a frequency domain complex exponentiation representing an initial phase and amplitude of a k-th subcarrier of an initial symbol of an initial slot. Also, s denotes a slot index, l denotes a symbol index, and $X_{s,l}[k]$ denotes a frequency domain complex exponentiation representing an initial phase and amplitude of a k-th subcarrier of an l-th symbol of an s-th slot. If k is an even number, $(-1)^{s \cdot k}$ is 1 at all times. Therefore, an initial phase of a k-th subcarrier of a start symbol of a slot may be the same regardless of a slot index. In contrast, if k is an odd number, $(-1)^{s \cdot k}$ is −1 for s=odd number and 1 for s=even number. Therefore, the initial phase of the k-th subcarrier of the start symbol of the slot may vary based on a slot index. If the symbol index l is numbered for each slot, l may be one of 0, 1, 2, . . . 6. Accordingly, P=1 and $$\frac{T_{cp}}{T_u} = 9/128.$$

If the normal CP is applied in the 5G NR standard, the sequence of the reference signal may be represented as Equation 7.

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right), \quad \text{[Equation 7]}$$
$$P = \ell \bmod(7 \cdot 2^\mu), \mu = 0, 1, 2, 3\ldots$$

In Equation 7, $\varphi_{init}^k$ denotes a frequency domain complex exponentiation representing an initial phase and amplitude of a k-th subcarrier of an initial symbol of an initial slot, and $X_{s,\ell}[k]$ denotes a frequency domain complex exponentiation representing an initial phase and amplitude of a k-th subcarrier of an l-th symbol of an s-th slot. Also, mod denotes a modulo function used to acquire a remainder. In the case of the normal CP of the LTE standard, numerology number $\mu=0$ and accordingly, P and l=0, . . . 6. Also, $\delta(\mu)$ is a Dirac delta function hat is defined as 1 only if $\mu=0$. An index portion equation of −1 that determines a sign of a subcarrier, i.e., $s \cdot k \cdot \delta(\mu)$, is defined if $\mu=0$, that is, if a subcarrier spacing is 15 kHz. The index portion of −1 is 0 in other subcarrier spacings, that is, if $\mu>0$. Therefore, start symbols of all of the subcarriers have a positive sign. If $\mu=0$ and s*k=odd number, $s \cdot k \cdot \delta(\mu)$ that is the index portion equation of −1 becomes an odd number and a start sign of a subcarrier becomes −1. That is, in the LTE standard or the 5G NR standard to which the subcarrier spacing of 15 kHz is applied, if k is an odd numbered subcarrier, a first symbol sign of each slot is +1 for slot number=even number and −1 for slot number=odd number. If the normal CP is applied, $$\frac{T_{cp}}{T_u} = \frac{9}{128}.$$

In the 5G NR standard, if the symbol index is numbered based on a subframe unit and, in this instance, if subcarrier spacing=15 kHz, a sequence of a reference signal may be represented as Equation 8.

$$X_\ell[k] = (-1)^{s \cdot k} \varphi_{init}^k \cdot \exp\left(j\frac{9}{64}kP\pi\right) \quad \text{[Equation 8]}$$
$$s = \left[\frac{\ell}{7}\right], P = \ell \bmod 7$$

In Equation 8, $\varphi_{init}^k$ denotes a frequency domain complex exponentiation representing an initial phase and amplitude of a k-th subcarrier of an initial symbol of an initial slot, and $X_\ell[k]$ denotes a frequency domain complex exponentiation representing an initial phase and amplitude of a k-th subcarrier of an l-th symbol. s denotes a maximum integer less than or equal to $$\frac{\ell}{7}.$$

Here, the parameter s is redefined since a length of a slot is not 0.5 msec if subcarrier spacing=15 kHz in the 5G NR standard. Here, P denotes a remainder acquired by dividing l by 7. For example, if l=10, s=1 and P=3.

In the 5G NR standard, if the subcarrier spacing is 15 kHz or higher (e.g., 30 kHz, 60 kHz, 120 kHz, 240 kHz), there is no need to change a sign of a sequence component based on a unit of 0.5 msec. Also, referring again to Equation 2, a length of a start symbol (l=0 or l=7·2$^\mu$) in 0.5 msec duration may differ from lengths of other symbols (l≠0 and l≠7·2$^\mu$). With the assumption that the normal CP is applied, if the subcarrier spacing is 15 kHz or higher in the 5G NR standard, a sequence of a reference signal may be represented as Equation 9.

$$\begin{cases} X_\ell[k] = \varphi_{init}^k & \ell = 0 \text{ or } \ell = 7 \cdot 2^\mu \\ X_\ell[k] = \varphi_{init}^k \cdot \exp\left(j\frac{9}{64}k\ell\pi\right) & \ell \neq 0 \text{ and } \ell \neq 7 \cdot 2^\mu \end{cases} \quad \text{[Equation 9]}$$

In Equation 9, $\mu$ denotes a parameter that determines a subcarrier spacing, $\varphi_{init}^k$ denotes a frequency domain complex exponentiation representing an initial phase and amplitude of a k-th subcarrier of an initial symbol of an initial slot, and $X_\ell[k]$ denotes a frequency domain complex exponentiation representing an initial phase and amplitude of a k-th subcarrier of an l-th symbol. Although numerology of the normal CP is applied in Equation 9, it is provided as an example only and the example embodiments are not limited thereto.

If the extended CP is applied in the LTE standard and the 5G NR standard, a sequence of a reference signal may be represented as Equation 10.

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in LTE} \quad \text{[Equation 10]}$$
$$X_{s,\ell}[k] = \varphi_{init}^k \cdot \exp\left(2\pi jk \cdot \ell \cdot \frac{T_{cp}}{T_u}\right) \text{ in 5GNR}$$

In Equation 10, in the LTE standard, k denotes a symbol index and may be 0 . . . 5. Also, in the 5G NR standard, k denotes the symbol index and may be 0 . . . 11. Also, $\varphi_{init}^k$ denotes a frequency domain complex exponentiation representing an initial phase and amplitude of a k-th subcarrier of an initial symbol of an initial slot, and $X_{s,\ell}[k]$ denotes a frequency domain complex exponentiation representing an initial phase and amplitude of a k-th subcarrier of an l-th symbol of an s-th slot. If k is an odd numbered subcarrier, a first symbol sign of each slot is +1 for slot number=even number and −1 for slot number=odd number. If k is an even numbered subcarrier, all of start number signs of each slot are +1. In the 5G NR standard, a single slot may include 12 symbols and accumulated CP duration in the slot may be three times (¼*12=3) of a valid period of a symbol. Accordingly, since a phase shift amount by the accumulated extended CP duration in a slot is 6 πk, initial phases of k-th subcarriers in start symbols of different slots may be equal to each other. In the extended CP, $T_{cp}/T_u=¼$.

If the symbol index is numbered for each subframe and the extended CP is applied, a sequence of a reference signal may be represented as Equation 11.

$$X_\ell[k] = (-1)^{s \cdot k} \varphi_{init}^k \cdot \exp\left(2\pi jk \cdot P \cdot \frac{T_{cp}}{T_u}\right), \quad \text{[Equation 11]}$$
$$s = \left[\frac{\ell}{6}\right], P = \ell \bmod 6 \text{ in LTE}$$
$$X_\ell[k] = \varphi_{init}^k \cdot \exp\left(2\pi jk \cdot P \cdot \frac{T_{cp}}{T_u}\right),$$
$$P = \ell \bmod 24 \text{ in 5GNR}$$

In Equation 11, k denotes a symbol index and may be 0 . . . 5. $\varphi_{init}^k$ denotes a frequency domain complex exponentiation representing an initial phase and amplitude of a k-th subcarrier of an initial symbol of an initial slot, and $X_l[k]$ denotes a frequency domain complex exponentiation representing an initial phase and amplitude of a k-th subcarrier of an l-th symbol. If 60 kHz subcarrier spacing is applied, P may be 0 . . . 23 in a symbol of the extended CP and $T_{cp}/T_u=\frac{1}{4}$.

Figure 7:
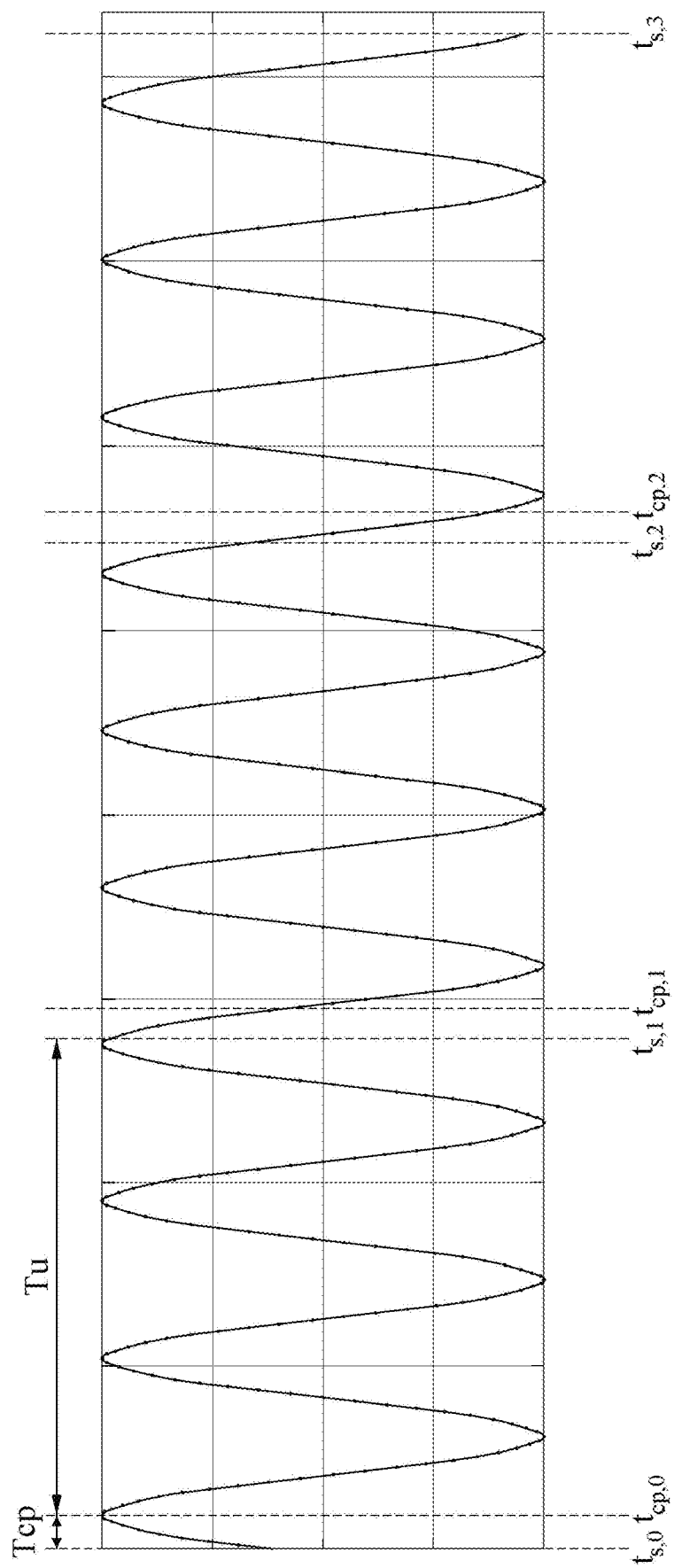
FIG. 7 illustrates an example of a waveform of a first reference signal or a second reference signal according to at least one example embodiment.

FIG. 7 illustrates an example of a waveform of a first reference signal or a second reference signal according to at least one example embodiment.

Referring to FIG. 7, a base station may generate a reference signal based on a sequence of a reference signal that is determined according to one of Equation 4 to Equation 11. Accordingly, a waveform of the reference signal of FIG. 7 may be continuous in a boundary between adjacent symbols, which differs from the example of FIG. 6. If a UE performs a fast Fourier transform (FFT), there may be no need to include an FFT window in a single symbol. That is, the UE may move, that is, shift the FFT window without considering a boundary between symbols. The UE may change a start point of a summation time interval that is proportional to a size of the FFT window in a time interval in which the reference signal is received, without considering the boundary between symbols. Accordingly, the UE may acquire a sufficient number of snapshot vectors.

Figure 8:
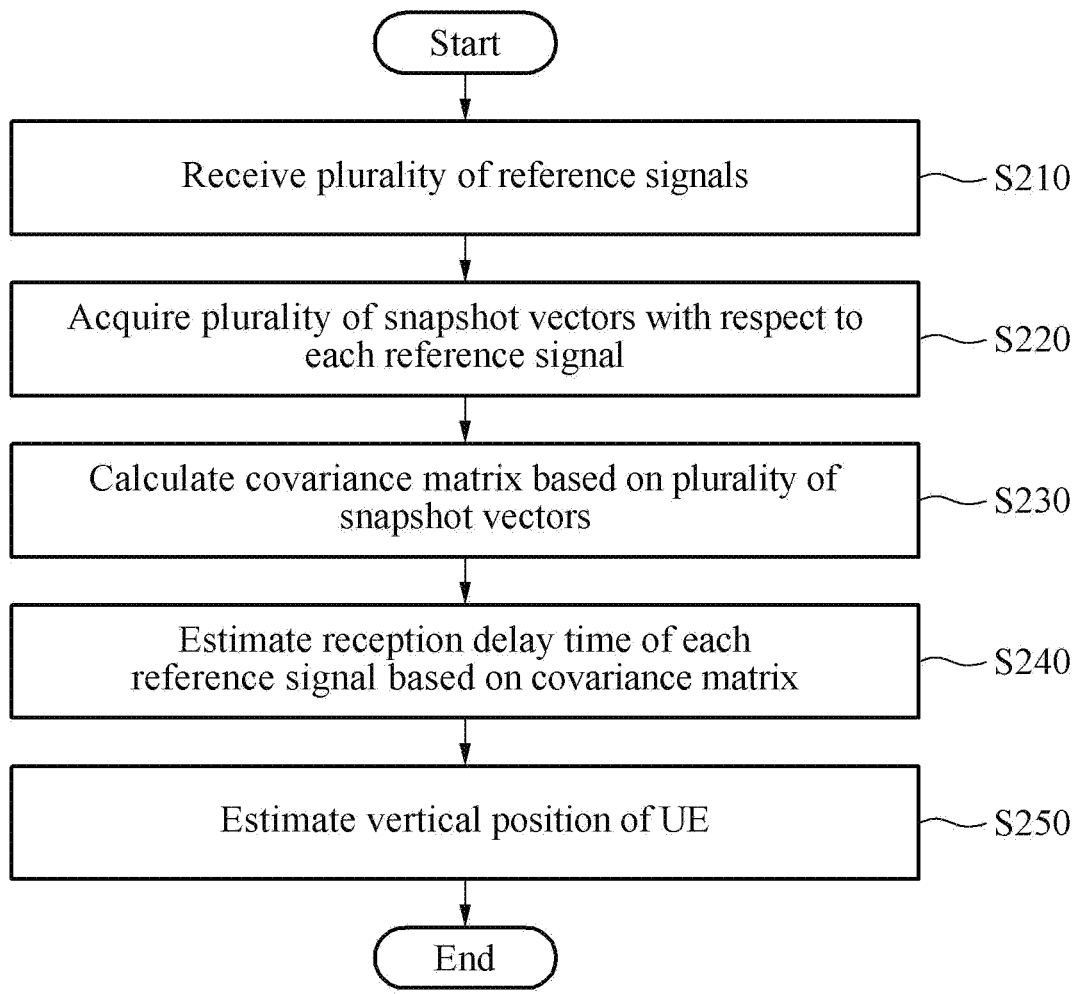
FIG. 8 is a flowchart illustrating an example of a positioning method of a user equipment (UE) according to at least one example embodiment.

FIG. 8 is a flowchart illustrating an example of a positioning method of a UE according to at least one example embodiment.

Referring to FIG. 8, in operation S210, the UE may receive a plurality of reference signals. For example, the UE may receive a first reference signal from the first transmitter 100A and may receive a second reference signal from the second transmitter 100B. If at least three transmitters are present, the UE may receive at least three reference signals.

In operation S220, the UE may acquire a plurality of first snapshot vectors with respect to the first reference signal and may acquire a plurality of second snapshot vectors with respect to the second reference signal. The UE may acquire a plurality of snapshot vectors by shifting a start point of a summation time interval within a time interval in which a reference signal is received.

Each of the plurality of snapshot vectors may correspond to a different summation time interval. If a waveform of each of subcarrier signals included in the reference signal is continuous regardless of a boundary between symbols, the UE may shift the start point of the summation time interval without considering the boundary between the symbols. For example, the UE may shift the start point of the summation time interval based on a sample time unit that is determined based on a sampling rate. As another example, the UE may shift the start point of the summation time interval based on a multiple unit of a sample time. The UE may acquire a plurality of snapshot vectors by shifting the start point of the summation time interval based on the sample time unit within a single symbol. A length of the summation time interval may be less than a length of a time interval in which the UE receives the reference signal.

The first reference signal transmitted from the first transmitter 100A may be represented at a time t according to Equation 12.

$$s_a(t) = A_1 e^{i(\omega_{v+1}t+\varphi_1)} + A_2 e^{i(\omega_{v+2}t+\varphi_2)} + \ldots + A_m e^{i(\omega_{v+m}t+\varphi_m)} = \sum_{p=1}^{m} A_p e^{i(\omega_{v+p}t+\varphi_p)}$$ [Equation 12]

In Equation 12, $s_a(t)$ denotes a reference signal transmitted at the time t. A signal represented by Equation 12 may be a baseband signal. Also, $A_p$ denotes a modulated strength component of a subcarrier signal having an angular frequency $\omega_{v+p}$. Here, v denotes an index smaller by 1 than an angular frequency index of a first subcarrier of a first subcarrier group. Also, in Equation 12, a domain of the time t may correspond to a time interval in which the reference signal is transmitted. For example, if the reference signal continues during n symbol periods, t may be one of values between 0 and $n\times(T_u+T_{CP})$.

In the following, with the assumption that normalization of $A_p=1$ is performed, expression of $A_p$ is omitted. However, it is provided as an example only. Unless the normalization of $A_p=1$ is performed, the following equations may be available within the range easily modifiable by one of ordinary skill in the art by further using $A_p$.

A baseband signal in which the first reference signal transmitted from the first transmitter 100A in Equation 12 is collected as N sample strings may be represented as a vector as shown in Equation 13. In a general OFDM system, N may be determined based on a size of an FFT window.

$$S_A = \begin{bmatrix} s_a(t) \\ s_a(t-1) \\ \vdots \\ s_a(t-N+1) \end{bmatrix} = \begin{bmatrix} e^{i(\omega_{v+1}t+\varphi_1)} + e^{i(\omega_{v+2}t+\varphi_2)} + \ldots + e^{i(\omega_{v+m}t+\varphi_m)} \\ e^{i(\omega_{v+1}(t-1)+\varphi_1)} + e^{i(\omega_{v+2}(t-1)+\varphi_2)} + \ldots + e^{i(\omega_{v+m}(t-1)+\varphi_m)} \\ \vdots \\ e^{i(\omega_{v+1}(t-N+1)+\varphi_1)} + e^{i(\omega_{v+2}(t-N+1)+\varphi_2)} + \ldots + e^{i(\omega_{v+m}(t-N+1)+\varphi_m)} \end{bmatrix}$$ [Equation 13]

In Equation 13, $S_A$ denotes a vector that includes samples of the first reference signal transmitted at N sample times.

Similar to Equation 12, the second reference signal may be represented by Equation 14.

$$s_b(t) = B_1 e^{i(\omega_{u+1}t+\phi_1)} + B_2 e^{i(\omega_{u+2}t+\phi_2)} + \ldots + B_m e^{i(\omega_{u+m}t+\phi_m)} = \sum_{p=1}^{m} B_p e^{i(\omega_{u+p}t+\phi_p)}$$ [Equation 14]

In Equation 14, $s_b(t)$ denotes the reference signal transmitted at the time t. A signal represented by Equation 14 may be a baseband signal. Also, $B_p$ denotes a modulated strength component of a subcarrier signal having an angular frequency $\omega_{u+p}$, and u denotes an index smaller by 1 than an angular frequency index of a first subcarrier of a second subcarrier group. In Equation 14, a domain of t may correspond to a time interval in which the reference signal is transmitted. For example, if the reference signal continues during n symbol periods, t may be one of values between 0 and n×($T_u$+$T_{CP}$).

Similar to Equation 13, even with respect to the second reference signal of Equation 14, samples of the second reference signal transmitted at N sample times may be represented as a vector.

A channel for subcarriers included in the first reference signal may be represented as Equation 15.

$$H_a = \begin{bmatrix} H_a(\omega_{v+1}) \\ H_a(\omega_{v+2}) \\ \vdots \\ H_a(\omega_{v+m}) \end{bmatrix} = \quad \text{[Equation 15]}$$

$$\begin{bmatrix} h_1^a e^{-i\omega_{v+1}\tau_{a1}} + h_2^a e^{-i\omega_{v+1}\tau_{a2}} + h_3^a e^{-i\omega_{v+1}\tau_{a3}} + \ldots \\ h_l^a e^{-i\omega_{v+1}\tau_{al}} \\ h_1^a e^{-i\omega_{v+2}\tau_{a1}} + h_2^a e^{-i\omega_{v+2}\tau_{a2}} + h_3^a e^{-i\omega_{v+2}\tau_{a3}} + \ldots \\ h_l^a e^{-i\omega_{v+2}\tau_{al}} \\ \vdots \\ h_1^a e^{-i\omega_{v+m}\tau_{a1}} + h_2^a e^{-i\omega_{v+m}\tau_{a2}} + h_3^a e^{-i\omega_{v+m}\tau_{a3}} + \ldots \\ h_l^a e^{-i\omega_{v+m}\tau_{al}} \end{bmatrix}$$

In Equation 15, $H_a$ denotes a channel matrix for the first reference signal, v denotes an index smaller by 1 than an angular frequency an index of a first subcarrier of a first subcarrier group, [$h_1^a$, $h_2^a$, $h_3^a$, ... $h_l^a$] denotes a size component for each multipath of $H_a$, l denotes a number of multipaths, and [$\tau_{a1}$, $\tau_{a2}$, ... $\tau_{al}$] denotes a channel delay time by a multipath. As described above, if the first reference signal includes subcarriers provided at equal intervals, each of columns of $H_a$ may be a geometric progression. According to the description of Equation 12 to Equation 15, an angular frequency index of each of subcarriers in the first subcarrier group may increase by one. That is, the subcarriers included in the first subcarrier group may be provided at equal intervals in the frequency domain. Likewise, an angular frequency index of each of subcarriers in the second subcarrier group may increase by one. However, it is provided as an example only. For example, the angular frequency index may increase by 2 or by 3. Since the angular frequency index constantly increases, each of the columns of $H_a$ may be a geometric equation. That is, $H_a$ may be represented as Vandermonde matrix.

The UE may receive the first reference signal and the second reference signal. Using Equation 12 and Equation 15, the first reference signal received at the UE may be represented as Equation 16.

$$y_a(t) = \sum_{p=1}^{m} A_p e^{i(\omega_{v+p}t+\varphi_p)} H_a(\omega_{v+p}) \quad \text{[Equation 16]}$$

In Equation 16, $y_a(t)$ denotes the first reference signal received at the UE, and $H_a(\omega_{v+p})$ denotes a channel for a subcarrier having an angular frequency $\omega_{v+p}$. Also, $\varphi_p$ denotes an initial phase component of a p-th subcarrier signal of the first transmitter 100A, and v denotes an index smaller by 1 than an angular frequency index of a first subcarrier of a first subcarrier group. If synchronization is not accurately performed between the base station and the UE, the UE may not secure information about $\varphi_p$.

Similar to Equation 15, a channel matrix for the second reference signal may be represented as Equation 17.

$$H_b = \begin{bmatrix} H_b(\omega_{u+1}) \\ H_b(\omega_{u+2}) \\ \vdots \\ H_b(\omega_{u+m}) \end{bmatrix} = \begin{bmatrix} \sum_{s=1}^{l} h_s^b e^{-i\omega_{u+1}\tau_{bs}} \\ \sum_{s=1}^{l} h_s^b e^{-i\omega_{u+2}\tau_{bs}} \\ \vdots \\ \sum_{s=1}^{l} h_s^b e^{-i\omega_{u+m}\tau_{bs}} \end{bmatrix} \quad \text{[Equation 17]}$$

In Equation 17, $H_b$ denotes a channel matrix for the second reference signal, u denotes an index smaller by 1 than an angular frequency index of a first subcarrier of the second subcarrier group, and [$h_1^b$, $h_2^b$, $h_3^b$, ... $h_s^b$] denotes a size component for each multipath of $H_b$.

Similar to Equation 16, the second reference signal received at the UE may be represented as Equation 18.

$$y_b(t) = \sum_{p=1}^{m} B_p e^{i(\omega_{u+p}t+\phi_p)} H_b(\omega_{u+p}) \quad \text{[Equation 18]}$$

In Equation 18, $y_b(t)$ denotes the first reference signal received at the UE, $H_a(\omega_{v+p})$ denotes a channel for a subcarrier having an angular frequency $\omega_{v+p}$, $\varphi_p$ denotes an initial phase component of a p-th subcarrier signal transmitted from the first transmitter 100A, and v denotes an index smaller by 1 than an angular frequency index of a first subcarrier of a first subcarrier group.

A baseband signal in which the first reference signal received at the UE in Equation 16 is collected as N sample strings may be represented as a vector as shown in Equation 19. In a general OFDM system, N may be determined based on a size of an FFT window.

$$Y_a(t) = \begin{bmatrix} y_a(t) \\ y_a(t-1) \\ \vdots \\ y_a(t-N+1) \end{bmatrix} \quad \text{[Equation 19]}$$

In Equation 19, $Y_a(t)$ denotes a vector that includes samples of the first reference signal received at the UE at N sample times. A time period that includes the N sample times may be referred to as a summation time interval. Therefore, $Y_a(t)$ may represent, as a vector, sample data of the first reference signal acquired in the summation time interval.

Complex conjugate numbers of a subcarrier corresponding to N sample times in the summation time interval may be represented in a vector form according to Equation 20.

$$DFT_k = [1 \; e^{i\omega_k} \; e^{i2\omega_k} \; \ldots \; e^{i(N-2)\omega_k} \; e^{i(N-1)\omega_k}] \quad \text{[Equation 20]}$$

In Equation 20, $DFT_k$ denotes a discrete Fourier transform (DFT) coefficient matrix used for FFT operation of a subcarrier having an angular frequency $\omega_k$. The UE may calculate a snapshot vector based on the vector including sample data of the first reference signal represented by Equation 19 and the DFT coefficient matrix represented by Equation 20. The UE may multiply the plurality of complex conjugate numbers and the plurality of sample data values, respectively, and may sum up multiplication result values. The aforementioned operation process may be represented as an inner product operation of a vector according to Equation 21.

$$DFT_k \cdot Y_a(t) = \begin{bmatrix} 1 \\ e^{i\omega_k} \\ \vdots \\ e^{i(N-1)\omega_k} \end{bmatrix}^T \begin{bmatrix} y_a(t) \\ y_a(t-1) \\ \vdots \\ y_a(t-N+1) \end{bmatrix} \quad [\text{Equation 21}]$$

$$= \sum_{n=0}^{N-1} y_a(t-n) e^{i\omega_k n}$$

$$= \sum_{n=0}^{N-1} \left( \sum_{p=1}^{m} e^{i(\omega_p(t-n)+\varphi_p)} H_a(\omega_p) \right) e^{i\omega_k n}$$

$$= \sum_{n=0}^{N-1} \left( e^{i(\omega_k t+\varphi_k)} H_a(\omega_k) + \sum_{p=1}^{m, p \neq k} e^{i((\omega_p-\omega_k)(t-n)+\varphi_p+\omega_k t)} H_a(\omega_p) \right)$$

$$= N \cdot e^{i(\omega_k t+\varphi_k)} H_a(\omega_k) + \sigma$$

In Equation 21, $\omega_k$ denotes an angular frequency of a k-th subcarrier, $DFT_k(t)$ denotes a DFT coefficient matrix used for FFT operation of a subcarrier having the angular frequency $\omega_k$. Also, $y_a(t)$ denotes a data value of the first reference signal received at the UE at the time t, and N denotes a length of the summation time interval. In a general OFDM system, N may be determined based on a size of an FFT window. Also, $\varphi_k$ denotes an initial phase component of a k-th subcarrier signal of the first transmitter 100A, and $H_a(\omega_k)$ denotes a channel for the k-th subcarrier.

Referring to Equation 21, an inner product result of $DFT_k(t)$ and $Y_a(t)$ may be represented as a summation of error component $\sigma$ and a multiplication of $H_a(\omega_k)$ and term $e^{i(\omega_k t+\varphi_k)}$ depending on the initial phase component of the k-th subcarrier. Also, $\sigma$ may be an error that degrades positioning precision as an interference component caused by noise and other orthogonal subcarrier components. Here, during a process of calculating an expectation value of a covariance matrix based on a plurality of snapshot vectors, the effect by the error component $\sigma$ may be offset and decrease. For example, the UE may calculate the expectation value of the covariance matrix based on the plurality of snapshot vectors that is acquired in a plurality of summation time intervals of which start points in times are t, t+1, t+2, t+3 . . . , respectively. This process may include an average calculation process. During the average calculation process, error components of different snapshot vectors may be offset and a level of contribution that the error components make to a calculation result of the covariance matrix may decrease. Accordingly, $\sigma$ may be ignored during the following process of calculating the covariance matrix.

In the aforementioned description, only a single subcarrier signal having an angular frequency $\omega_k$ is considered. If a first subcarrier group of the first reference signal includes subcarriers having angular frequencies $\omega_{v+1}$ to $\omega_{v+m}$, Equation 21 may be represented as Equation 22 by considering all of the subcarriers included in the first subcarrier group.

$$y_A = \begin{bmatrix} DFT_{v+1} \\ DFT_{v+2} \\ \vdots \\ DFT_{v+m} \end{bmatrix} \cdot Y_a(t) = N \begin{bmatrix} H(\omega_{v+1}) e^{i(\omega_{v+1} t+\varphi_1)} \\ H(\omega_{v+2}) e^{i(\omega_{v+2} t+\varphi_2)} \\ \vdots \\ H(\omega_{v+m}) e^{i(\omega_{v+m} t+\varphi_m)} \end{bmatrix} + \sigma \quad [\text{Equation 22}]$$

In Equation 22, $y_A$ denotes a snapshot vector of the first reference signal acquired by the UE, and v denotes an index smaller by 1 than an angular frequency index of a first subcarrier of the first subcarrier group. Referring to Equation 22, $y_A$ may be determined based on a multiplication between DFT coefficient matrices corresponding to angular frequencies of subcarriers belonging to the first subcarrier group and a plurality of pieces of sample data of the first reference signal received at the UE. The UE may acquire the plurality of snapshot vectors with respect to the first reference signal by shifting a start point t of the summation time interval.

Likewise, the UE may acquire a snapshot vector of the second reference signal. Similar to Equation 22, the snapshot vector of the second reference signal may be represented as Equation 23.

$$y_B = \begin{bmatrix} DFT_{u+1}(t) \\ DFT_{u+2}(t) \\ \vdots \\ DFT_{u+m}(t) \end{bmatrix} \cdot y_b(t) = N \begin{bmatrix} H(\omega_{u+1}) e^{i(\omega_{u+1} t+\phi_1)} \\ H(\omega_{u+2}) e^{i(\omega_{u+2} t+\phi_2)} \\ \vdots \\ H(\omega_{u+m}) e^{i(\omega_{u+m} t+\phi_m)} \end{bmatrix} + \sigma \quad [\text{Equation 23}]$$

In Equation 23, $y_B$ denotes the snapshot vector of the second reference signal acquired by the UE, and u denotes an index smaller by 1 than an angular frequency index of a first subcarrier of the second subcarrier group.

A method of acquiring, by the UE, a snapshot vector is not limited to the aforementioned example embodiments. For example, the UE may extract a plurality of subcarrier waveforms using a filter bank that includes peak filters each configured to extract a sine wave component for each subcarrier. As another example, the UE may employ a DFT filter method for restoring a plurality of subcarrier waveforms using a finite impulse response (FIR) filter bank configured as DFT coefficients corresponding to a size of an FFT window. The UE may employ a variety of methods, for example, a sliding FFT filter method for collecting N-length sample groups in a time domain sample, performing an FFT on the collected sample groups, and continuously extracting only a plurality of subcarrier components therefrom.

Since the aforementioned methods need to repeat a complex multiplication operation corresponding to the size of the FFT window every time an input sample is given, a calculation amount may increase. However, the aforementioned snapshot vector acquiring method may reduce a calculation amount by omitting a calculation with respect to a time interval in which summation time intervals overlap during a calculation process.

In operation S230, the UE may calculate a covariance matrix based on the plurality of snapshot vectors. For example, the UE may calculate a first covariance matrix based on snapshot vectors of the first reference signal and may calculate a second covariance matrix based on snapshot vectors of the second reference signal.

The snapshot vector of the first reference signal represented as Equation 22 may be represented again as Equation 24.

$$y_A = N \begin{bmatrix} H(\omega_{v+1})e^{i(\omega_{v+1}t+\varphi_1)} \\ H(\omega_{v+2})e^{i(\omega_{v+2}t+\varphi_2)} \\ \vdots \\ H(\omega_{v+m})e^{i(\omega_{v+m}t+\varphi_m)} \end{bmatrix} + \sigma = \quad \text{[Equation 24]}$$

$$N \cdot \text{diag}\begin{bmatrix} e^{i\varphi_1} \\ e^{i\varphi_2} \\ \vdots \\ e^{i\varphi_m} \end{bmatrix} \begin{bmatrix} e^{i\omega_1(t-\tau_{a1})} & e^{i\omega_1(t-\tau_{a2})} & \cdots & e^{i\omega_1(t-\tau_{al})} \\ e^{i\omega_2(t-\tau_{a1})} & e^{i\omega_2(t-\tau_{a2})} & \cdots & e^{i\omega_2(t-\tau_{al})} \\ \vdots & \vdots & \ddots & \vdots \\ e^{i\omega_m(t-\tau_{a1})} & e^{i\omega_m(t-\tau_{a2})} & \cdots & e^{i\omega_m(t-\tau_{al})} \end{bmatrix}$$

$$\begin{bmatrix} h_1^a e^{-i\omega_v(t-\tau_{a1})} \\ h_2^a e^{-i\omega_v(t-\tau_{a2})} \\ \vdots \\ h_l^a e^{-i\omega_v(t-\tau_{al})} \end{bmatrix} + \sigma$$

Notations of Equation 24 have the same parameters as those represented by notations of Equation 12 to Equation 23 and thus, description related thereto is omitted. In Equation 24, an angular frequency of a subcarrier, $\omega_k = 2\pi k/N$. Therefore, Equation 24 may be changed to Equation 25.

$$y_A = N \cdot \text{diag}\begin{bmatrix} e^{i\varphi_1} \\ e^{i\varphi_2} \\ \vdots \\ e^{i\varphi_m} \end{bmatrix} \begin{bmatrix} e^{i\theta_1} & e^{i\theta_2} & \cdots & e^{i\theta_l} \\ e^{2i\theta_1} & e^{2i\theta_2} & \cdots & e^{2i\theta_l} \\ \vdots & \vdots & \ddots & \vdots \\ e^{mi\theta_1} & e^{mi\theta_2} & \cdots & e^{mi\theta_l} \end{bmatrix} \quad \text{[Equation 25]}$$

$$\begin{bmatrix} h_1^a e^{-i\omega_v(t-\tau_{a1})} \\ h_2^a e^{-i\omega_v(t-\tau_{a2})} \\ \vdots \\ h_l^a e^{-i\omega_v(t-\tau_{al})} \end{bmatrix} + \sigma,$$

$$\theta_s = \frac{2\pi}{N}(t - \tau_{as})$$

In Equation 25, it can be verified that each column of an intermediate matrix is a geometric progression. That is, the intermediate matrix corresponds to Vandermonde matrix. The Vandermonde matrix may be represented again using a steering matrix. The steering matrix may be represented as steering vectors. A steering vector may be represented as Equation 26.

$$a(\theta_s) = [e^{i\theta_s} \; e^{2i\theta_s} \; \cdots \; e^{mi\theta_s}]^T = \quad \text{[Equation 26]}$$
$$[e^{i2\pi(t-\tau_{as})/N} \; e^{2i2\pi(t-\tau_{as})/N} \; \cdots \; e^{mi2\pi(t-\tau_{as})/N}]^T$$

In Equation 26, $a(\theta_s)$ denotes a steering vector corresponding to an s-th column of the intermediate matrix in Equation 25. Using the steering vector of Equation 26, a steering matrix may be represented as Equation 27.

$$A_a = [a(\theta_1)a(\theta_2) \cdots a(\theta_l)] \quad \text{[Equation 27]}$$

In Equation 27, $A_a$ denotes the steering matrix and may correspond to the intermediate matrix of Equation 25. Using the steering matrix of Equation 27, the snapshot vector of Equation 25 may be represented as Equation 28.

$$y_A = N \cdot \text{diag}\begin{bmatrix} e^{i\varphi_1} \\ e^{i\varphi_2} \\ \vdots \\ e^{i\varphi_m} \end{bmatrix} [a(\theta_1) \; a(\theta_2) \; \cdots \; a(\theta_l)] \quad \text{[Equation 28]}$$

$$\begin{bmatrix} h_1^a e^{-i\omega_v(t-\tau_{a1})} \\ h_2^a e^{-i\omega_v(t-\tau_{a2})} \\ \vdots \\ h_l^a e^{-i\omega_v(t-\tau_{al})} \end{bmatrix} + \sigma$$

The first covariance matrix may be represented as Equation 29.

$$R_{AA} = E[Y_A Y_A^H] \quad \text{[Equation 29]}$$

In Equation 29, $R_{AA}$ denotes the first covariance matrix, $Y_A$ denotes a snapshot vector of the first reference signal, $E[Y_A Y_A^H]$ denotes an expectation value or an average of $Y_A Y_A^H$ calculated based on a plurality of snapshot vectors of the first reference signal. Equation 29 may be simplified and represented as Equation 30.

$$R_{AA} = N^2 \cdot A_a R_{hh} A_a^H \quad \text{[Equation 30]}$$

In a similar manner, a second covariance matrix may be represented as Equation 31.

$$R_{BB} = N^2 \cdot A_b R_{hh} A_b^H \quad \text{[Equation 31]}$$

In Equation 31, $R_{BB}$ denotes the second covariance matrix, and $a(\vartheta_s)$ denotes a steering vector used to calculate the second covariance matrix. Here, $a(\vartheta_s) = [e^{i\vartheta_s} \; e^{2i\vartheta_s} \; \cdots \; e^{mi\vartheta_s}]^T$. Also, $A_b$ denotes a steering matrix used to calculate the second covariance matrix. Here, $A_b = [a(\vartheta_1) \; a(\vartheta_2) \; \cdots \; a(\vartheta_l)]$.

In S240, the UE may estimate a reception delay time of the first reference signal and a reception delay time of the second reference signal based on the covariance matrix. The UE may estimate the reception delay time of the first reference signal using the first covariance matrix. The UE may estimate the reception delay time of the second reference signal using the second covariance matrix.

The UE may estimate the reception delay time of the first reference signal and the reception delay time of the second reference signal according to Equation 32.

$$R_{AA} q_i = \lambda_i q_i, i = 1 \sim m$$
$$R_{BB} g_i = \gamma_i g_i, i = 1 \sim m \quad \text{[Equation 32]}$$

In Equation 32, $R_{AA}$ denotes a first covariance matrix and $R_{AA}$ denotes an m×m square matrix. Also, $R_{BB}$ denotes a second covariance matrix and $R_{BB}$ denotes an m×m square matrix. Also, $\lambda_i$ denotes an eigenvalue of the first covariance matrix, and $\gamma_i$ denotes an eigenvalue of the second covariance matrix. Also, $q_i$ denotes an eigenvector of the first covariance matrix, and $g_i$ denotes an eigenvector of the second covariance matrix.

If the UE is capable of being aware of a maximum number (l<m) of multipaths included in a signal channel, a space including eigenvectors $q_{l+1}$ to $q_m$ of the first covariance matrix and a space including eigenvectors $g_{l+1}$ to $g_m$ of the second covariance matrix may be regarded to belong to a noise space orthogonal to a signal space. The UE may apply a super resolution algorithm, such as, for example, a multiple signal classification (MUSIC) algorithm, an estimation of signal parameters via rotational invariance techniques (ESPRIT) algorithm, and the like.

For example, the UE may apply a MUSIC algorithm to the first covariance matrix according to Equation 33.

$$P_{MUSIC}(\theta_s) = \frac{1}{\sum_{i=l+1}^{N} |a^H(\theta_s)q_i|^2} = \frac{1}{A_a^H Q_n Q_n^H A_a},$$ [Equation 33]

$$\theta_s = \frac{2\pi}{N}(t - \tau_{as})$$

In Equation 33, $a(\theta_s)$ denotes a steering vector for a snapshot vector of the first reference signal described above with reference to Equation 26 and $q_i$ denotes an i-th eigenvector of the first covariance matrix. Referring to Equation 33, the UE may calculate $\theta_s$ such that $P_{MUSIC}(\theta_s)$ may have a peak value. The UE may calculate a delay time $\tau_{as}$ using $$\theta_s = \frac{2\pi}{N}(t - \tau_{as})$$

such that $P_{MUSIC}(\theta_s)$ may have a peak value. If there is a plurality of values for the delay time $\tau_{as}$ such that $P_{MUSIC}(\theta_s)$ may have a peak value, a smallest value for the delay time $\tau_{as}$ may be estimated as the reception delay time of the first reference signal.

The UE may apply the MUSIC algorithm to the second covariance matrix according to Equation 34.

$$P_{MUSIC}(\vartheta_s) = \frac{1}{\sum_{i=l+1}^{N} |a^H(\vartheta_s)g_i|^2} = \frac{1}{A_b^H G_n G_n^H A_b},$$ [Equation 34]

$$\vartheta_s = \frac{2\pi}{N}(t - \tau_{bs})$$

In Equation 34, $a(\vartheta_s)$ denotes a steering vector for a snapshot vector of the second reference signal and $g_i$ denotes an i-th eigenvector of the second covariance matrix. Referring to Equation 34, the UE may calculate $\vartheta_s$ such that $P_{MUSIC}(\vartheta_s)$ may have a peak value. The UE may calculate a delay time $\tau_{bs}$ using $$\vartheta_s = \frac{2\pi}{N}(t - \tau_{bs})$$

such that $P_{MUSIC}(\theta_s)$ may have a peak value. If there is a plurality of values for the delay time $\tau_{bs}$ such that $P_{MUSIC}(\vartheta_s)$ may have a peak value, a smallest value for the delay time $T_{bs}$ may be estimated as the reception delay time of the second reference signal.

In operation S250, the UE may estimate a position of the UE in a vertical direction.

For example, the UE may calculate a difference between the reception delay time of the first reference signal and the reception delay time of the second reference signal according to Equation 35.

$$\tau_{ab} = \tau_{a1} - \tau_{b1} = \frac{N}{2\pi}(\theta_1 - \vartheta_1)$$ [Equation 35]

In Equation 35, $\tau_{ab}$ denotes the difference between the reception delay time of the first reference signal and the reception delay time of the second reference signal.

The base station may provide the UE with information about the difference between the reception delay time of the first reference signal and the reception delay time of the second reference signal at one or more reference points. The UE may estimate a vertical position of the UE, that is, a position of the UE in the vertical direction based on the provided information about the difference between the reception delay time of the first reference signal and the reception delay time of the second reference signal at the reference point, and the difference between the reception delay time of the first reference signal and the reception delay time of the second reference signal estimated by the UE.

Figure 9:
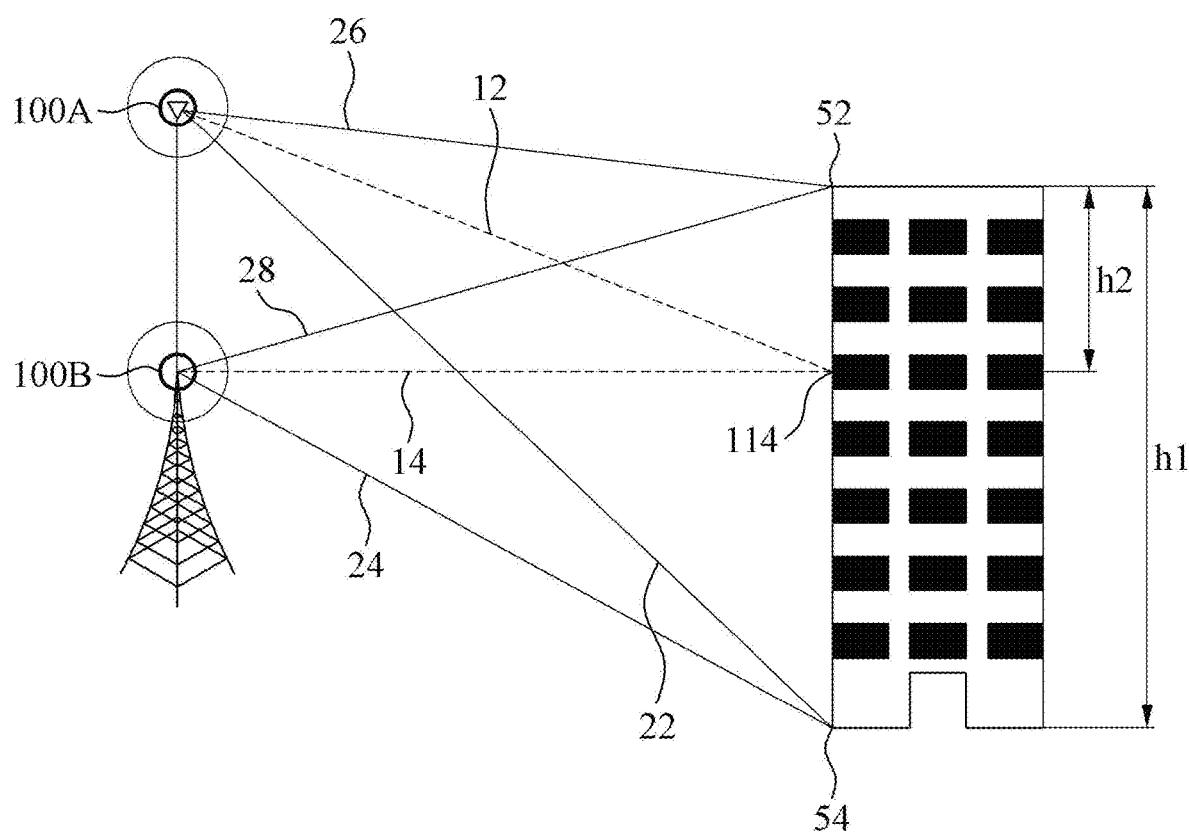
FIG. 9 illustrates an example of describing a positioning method of a UE according to at least one example embodiment.

FIG. 9 illustrating an example of describing a positioning method of a UE according to at least one example embodiment.

Referring to FIG. 9, a base station may acquire in advance information about a difference between a reception delay time of a first reference signal 26 and a reception delay time of a second reference signal 28 arriving at a first reference point 52. The base station may acquire in advance information about a difference between a reception delay time of a first reference signal 22 and a reception delay time of a second reference signal 24 arriving at a second reference point 54. Although FIG. 9 illustrates an example in which the first reference point 52 is a top of a building and the second reference point 54 is a bottom of the building, it is provided as an example only. The first reference point 52 and the second reference point 54 may refer to two points with different heights.

With the assumption that a difference value between a reception time of a first reference signal and a reception time of a second reference signal linearly varies, the UE may estimate a vertical position of the UE according to Equation 36.

$$h1:h2 = (\Delta\tau_{54} - \Delta\tau_{52}):(\Delta\tau_{114} - \Delta\tau_{52})$$ [Equation 36]

In Equation 36, h1 denotes a height difference between the first reference point 52 and the second reference point 54, h2 denotes a height difference between the first reference point 52 and the position 114 of the UE, $\Delta\tau_{52}$ denotes the difference between the reception delay time of the first reference signal 26 and the reception delay time of the second reference signal 28 at the first reference point 52, $\Delta\tau_{54}$ denotes the difference between the reception delay time of the first reference signal 22 and the reception delay time of the second reference signal 24 at the second reference point 54, and $\Delta\tau_{114}$ denotes a difference between a reception delay time of a first reference signal 12 and a reception delay time of a second reference signal 14 at the position 114 of the UE.

Although it is assumed that a difference value between a reception time of a first reference signal and a reception time of a second reference signal linearly varies based on a position of the UE in a building, it is provided as an example only and an actual environment may differ. Accordingly, the UE may estimate a vertical position of the UE using a further precisely derived equation.

Figure 10:
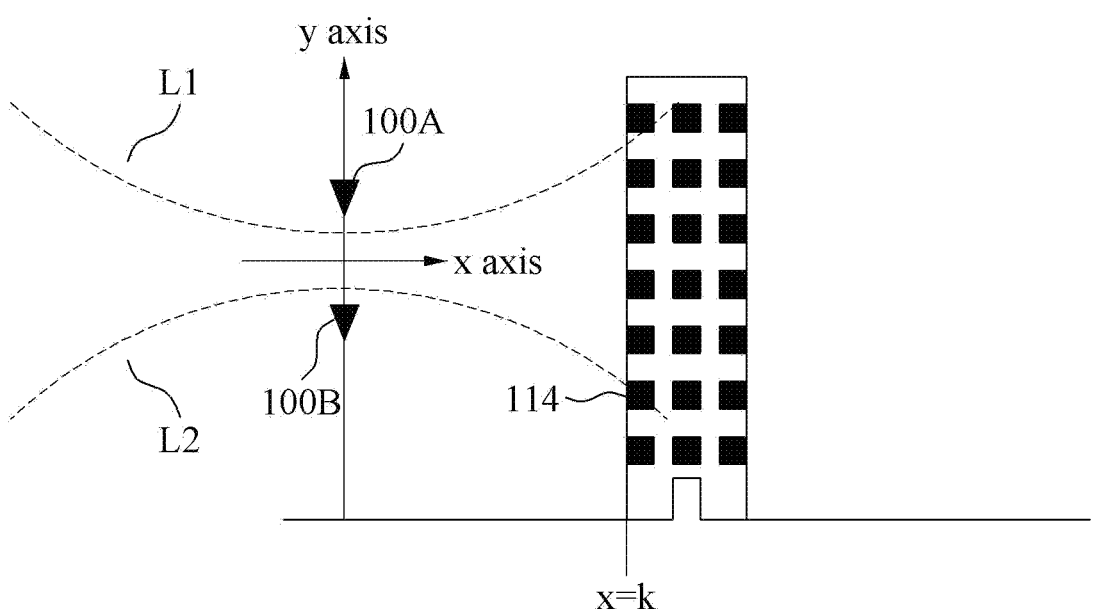
FIG. 10 illustrates an example of describing a process of deriving an equation of estimating a vertical position of a UE according to at least one example embodiment.

FIG. 10 illustrates an example of describing a process of deriving an equation of estimating a vertical position of a UE according to at least one example embodiment.

Referring to FIG. 10, a hyperbola (L1, L2) in which two foci correspond to a position of the first transmitter 100A and a position of the second transmitter 100B, respectively, while passing the position 114 of the UE may be present. An equation of the hyperbola (L1, L2) may be represented as Equation 37.

$$\frac{x^2}{a^2} - \frac{y^2}{b^2} = -1 \qquad \text{[Equation 37]}$$

With the assumption that a distance between the first transmitter 100A and the second transmitter 100B is 2d, c may meet the following Equation 38.

$$c^2 = a^2 + b^2 \qquad \text{[Equation 38]}$$

In Equation 38, a and b denote parameters used to determine the hyperbola equation represented as Equation 37.

Also, the difference between the reception delay time of the first reference signal and the reception delay time of the second reference signal estimated by the UE may meet the following Equation 39.

$$c_{light} \times \Delta\tau_{114} = \pm 2b \qquad \text{[Equation 39]}$$

In Equation 39, $c_{light}$ denotes a constant that represents a light velocity, $\Delta\tau_{114}$ denotes the difference between the reception delay time of the first reference signal and the reception delay time of the second reference signal at the position 114 of the UE, and b denotes a parameter shown in Equation 37 and Equation 38. In Equation 39, ± may vary based on the position 114 of the UE. For example, if the position 114 of the UE is above the x axis, the '−' sign may apply in Equation 39. On the contrary, if the position 114 of the UE is below the x axis, the '+' sign may apply in the Equation 39.

Using Equation 38, Equation 37 may be represented as Equation 40.

$$\frac{x^2}{c^2 - b^2} - \frac{y^2}{b^2} = -1 \qquad \text{[Equation 40]}$$

With the assumption that the UE is capable of measuring a horizontal position, an x-coordinate k of the UE may be substituted for Equation 40. If the horizontal coordinate k of the UE is substituted for Equation 40, a vertical coordinate y of the UE may be represented as Equation 41.

$$y = \pm b \sqrt{\frac{c^2 + k^2 - b^2}{c^2 - b^2}} \qquad \text{[Equation 41]}$$

In Equation 41, y denotes the vertical coordinate of the UE. Here, c may correspond to a half of the height difference between the first transmitter 100A and the second transmitter 100B and b may be determined according to Equation 38. Also, k may correspond to the x coordinate of the UE.

Using Equation 38, Equation 41 may be represented as Equation 42.

$$y = \frac{-c_{light}\Delta\tau_{114}}{2} \sqrt{\frac{d^2 + 4k^2 - (c_{light}\Delta\tau_{114})^2}{d^2 - (c_{light}\Delta\tau_{114})^2}} \qquad \text{[Equation 42]}$$

In Equation 42, $c_{light}$ denotes a constant representing a light velocity, $\Delta\tau_{114}$ denotes the difference between the reception delay time of the first reference signal and the reception delay time of the second reference signal at the position 114 of the UE, d denotes the height difference between the first transmitter 100A and the second transmitter 100B, and k denotes the x coordinate of the UE. If the position 114 of the UE is above the x axis, $\Delta\tau_{114}$ may have a minus value and the y coordinate of the UE may be positive. On the contrary, if the position 114 of the UE is below the axis, the $\Delta\tau_{114}$ may have a positive value and the y coordinate of the UE may be negative.

The UE may acquire in advance information about remaining parameters excluding $\Delta\tau_{114}$ in Equation 42. For example, the UE may receive information about the parameter d from the base station. The UE may acquire information about the x coordinate value k of the UE through positioning in the horizontal direction. The UE may estimate the difference $\Delta\tau_{114}$ between the reception delay time of the first reference signal and the reception delay time of the second reference signal. The UE may acquire the y coordinate of the UE by substituting the estimated difference $\Delta\tau_{114}$ for Equation 42.

A method and apparatus for positioning according to example embodiments are described above with reference to FIGS. 1 to 10. According to at least one example embodiment, it is possible to estimate a position of a UE in a vertical direction based on a difference between reception delay times of reference signals transmitted at different heights. Also, according to at least one example embodiments, it is possible to improve an accuracy in estimating a position of a UE in a vertical direction in such a manner that the UE acquires a plurality of snapshot vectors and estimates a reception delay time of a reference signal based on the acquired snapshot vectors. Also, according to at least one example embodiment, a base station may transmit a reference signal having a waveform continuous in a boundary between symbols and a UE may readily acquire a plurality of snapshot vectors accordingly. Also, according to at least one example embodiments, a base station may transmit a reference signal using subcarriers provided at equal intervals in a frequency domain and a UE may readily calculate a snapshot vector and a covariance matrix.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning method of a user equipment performed by the user equipment, the positioning method comprising:
receiving a first reference signal and a second reference signal from at least two transmitters installed at positions with different heights;
acquiring a plurality of first snapshot vectors based on received data samples of the first reference signal and acquiring a plurality of second snapshot vectors based on received data samples of the second reference signal;
calculating a first covariance matrix based on the plurality of first snapshot vectors and calculating a second covariance matrix based on the plurality of second snapshot vectors;
estimating a difference between a reception delay time of the first reference signal and a reception delay time of the second reference signal based on the first covariance matrix and the second covariance matrix; and
estimating a vertical position of the user equipment based on the difference between the reception delay time of the first reference signal and the reception delay time of the second reference signal.

2. The positioning method of claim 1, wherein the first reference signal includes a plurality of subcarriers included in a first subcarrier group, and the second reference signal includes a plurality of subcarriers included in a second subcarrier group.

3. The positioning method of claim 2, wherein the plurality of subcarriers included in the first subcarrier group and the plurality of subcarriers included in the second subcarrier group are provided at equal intervals in a frequency domain.

4. The positioning method of claim 2, wherein a subcarrier included in the first subcarrier group and a subcarrier included in the second subcarrier group are orthogonal to each other.

5. The positioning method of claim 1, wherein each of the first reference signal and the second reference signal is transmitted through a plurality of consecutive symbols, and a waveform of each of the first reference signal and the second reference signal continues in a boundary between consecutive symbols.

6. The positioning method of claim 1, wherein each of the first snapshot vector and the second snapshot vector is represented as a multiplication of a plurality of matrices, and at least one of the plurality of matrices meets a condition for Vandermonde matrix.

7. The positioning method of claim 1, further comprising: calculating an eigenvector of the first covariance matrix and an eigenvector of the second covariance matrix, estimating the reception delay time of the first reference signal based on the eigenvector of the first covariance matrix, and estimating the reception delay time of the second reference signal based on the eigenvector of the second covariance matrix.

8. The positioning method of claim 1, further comprising: acquiring reference information about the difference between the reception delay time of the first reference signal and the reception delay time of the second reference signal at one or more reference points,
wherein the estimating of the vertical position of the user equipment comprises estimating the vertical position of the user equipment based on the reference information and the difference between the reception delay time of the first reference signal and the reception delay time of the second reference signal.

9. The positioning method of claim 1, further comprising: acquiring information about a horizontal position coordinate of the user equipment,
wherein the estimating of the vertical position of the user equipment comprises estimating the vertical position of the user equipment based on the horizontal position coordinate of the user equipment and the difference between the reception delay time of the first reference signal and the reception delay time of the second reference signal.

10. A user equipment comprising:
a communication interfacer configured to communicate with another apparatus;
a processor; and
a memory configured to store at least one instruction executed through the processor,
wherein the at least one instruction causes the user equipment to receive a first reference signal and a second reference signal from at least two transmitters installed at positions with different heights, to acquire a plurality of first snapshot vectors based on received data samples of the first reference signal and acquire a plurality of second snapshot vectors based on received data samples of the second reference signal, to calculate a first covariance matrix based on the plurality of first snapshot vectors and calculate a second covariance matrix based on the plurality of second snapshot vectors, to estimate a difference between a reception delay time of the first reference signal and a reception delay time of the second reference signal based on the first covariance matrix and the second covariance matrix, and to estimate a vertical position of the user equipment based on the difference between the reception delay time of the first reference signal and the reception delay time of the second reference signal.

11. The user equipment of claim 10, wherein the first reference signal includes a plurality of subcarriers included in a first subcarrier group, and the second reference signal includes a plurality of subcarriers included in a second subcarrier group.

12. The user equipment of claim 11, wherein the plurality of subcarriers included in the first subcarrier group and the plurality of subcarriers included in the second subcarrier group are provided at equal intervals in a frequency domain.

13. The user equipment of claim 11, wherein a subcarrier included in the first subcarrier group and a subcarrier included in the second subcarrier group are orthogonal to each other.

14. The user equipment of claim 10, wherein each of the first reference signal and the second reference signal is transmitted through a plurality of consecutive symbols, and a waveform of each of the first reference signal and the second reference signal continues in a boundary between consecutive symbols.

15. The user equipment of claim 10, wherein each of the first snapshot vector and the second snapshot vector is represented as a multiplication of a plurality of matrices, and at least one of the plurality of matrices meets a condition for Vandermonde matrix.

16. The user equipment of claim 10, wherein the at least one instruction causes the user equipment to calculate an eigenvector of the first covariance matrix and an eigenvector of the second covariance matrix, to estimate the reception delay time of the first reference signal based on the eigenvector of the first covariance matrix, and to estimate the reception delay time of the second reference signal based on the eigenvector of the second covariance matrix.

17. The user equipment of claim 10, wherein the at least one processor causes the user equipment to acquire reference information about the difference between the reception delay time of the first reference signal and the reception delay time of the second reference signal at one or more reference points, and to estimate the vertical position of the user equipment based on the reference information and the difference between the reception delay time of the first reference signal and the reception delay time of the second reference signal.

18. The user equipment of claim 10, wherein the at least one processor causes the user equipment to acquire information about a horizontal position coordinate of the user equipment, and to estimate the vertical position of the user equipment based on the horizontal position coordinate of the user equipment and the difference between the reception delay time of the first reference signal and the reception delay time of the second reference signal.

* * * * *